April 18, 1967 F. OTIS 3,314,271

PUNCH PRESS

Filed April 3, 1964 6 Sheets-Sheet 1

INVENTOR.
FRED OTIS
BY LeBlanc and Shur
ATTORNEYS

April 18, 1967  F. OTIS  3,314,271

PUNCH PRESS

Filed April 3, 1964  6 Sheets-Sheet 2

INVENTOR.
BY  FRED OTIS
LeBlanc and Shur
ATTORNEYS

April 18, 1967  F. OTIS  3,314,271

PUNCH PRESS

Filed April 3, 1964  6 Sheets-Sheet 4

1 1/3 PROGRESSIONS
PART 3 1/8" LONG

| CUT OFF CYCLES | PROGRESSIONS FROM DIE ||||
|---|---|---|---|---|
| | BLK | BL.C | BL.B | BL.A |
| 1st | 1 | 2 | 3 | 4 |
| 2nd | 5 | 6 | 7 | 8 |
| 3rd | - | 10 | 11 | 12 |
| 4th | - | 14 | 15 | 16 |
| 5th | | | | |
| 6th | | | | |
| etc | | | | |

1 2/3 PROGRESSIONS
PART 3 29/32" LONG

| CUT OFF CYCLES | PROGRESSIONS FROM DIE |||||
|---|---|---|---|---|---|
| | BLK | BL.B | BLK | BL.C | BL.A |
| 1st | 1 | 2 | 3 | 4 | 5 |
| 2nd | 6 | 7 | - | 9 | 10 |
| 3rd | - | 12 | - | 14 | 15 |
| 4th | - | 17 | - | 19 | 20 |

2 1/3 PROGRESSIONS
PART 5 15/32" LONG

| CUT OFF CYCLES | PROGRESSIONS FROM DIE |||||||
|---|---|---|---|---|---|---|---|
| | BLK | BLK | BL.C | BLK | BL.B | BLK | BL.A |
| 1st | 1 | 2 | 3 | 4 | 5 | 6 | 7 |
| 2nd | 8 | - | 10 | - | 12 | - | 14 |
| 3rd | - | - | 17 | - | 19 | - | 21 |
| 4th | - | - | 24 | - | 26 | - | 28 |

2 2/3 PROGRESSIONS
PART 6 1/4" LONG

| CUT OFF CYCLES | PROGRESSIONS FROM DIE ||||||||
|---|---|---|---|---|---|---|---|---|
| | BLK | BLK | BL.B | BLK | BLK | BL.C | BLK | BL.A |
| 1st | 1 | 2 | 3 | 4 | 5 | 6 | 7 | 8 |
| 2nd | 9 | - | 11 | - | - | 14 | - | 16 |
| 3rd | - | - | 19 | - | - | 22 | - | 24 |
| 4th | - | - | 27 | - | - | 30 | - | 32 |

3 1/3 PROGRESSIONS
PART 7 13/16" LONG

| CUT OFF CYCLES | PROGRESSIONS FROM DIE ||||||||||
|---|---|---|---|---|---|---|---|---|---|---|
| | BLK | BLK | BLK | BL.C | BLK | BLK | BL.B | BLK | BLK | BL.A |
| 1st | 1 | 2 | 3 | 4 | 5 | 6 | 7 | 8 | 9 | 10 |
| 2nd | 11 | - | - | 14 | - | - | 17 | - | - | 20 |
| 3rd | - | - | - | 24 | - | - | 27 | - | - | 30 |
| 4th | - | - | - | 34 | - | - | 37 | - | - | 40 |

3 2/3 PROGRESSIONS
PART 8 19/32" LONG

| CUT OFF CYCLES | PROGRESSIONS FROM DIE |||||||||||
|---|---|---|---|---|---|---|---|---|---|---|---|
| | BLK | BLK | BLK | BL.B | BLK | BLK | BLK | BL.C | BLK | BLK | BL.A |
| 1st | 1 | 2 | 3 | 4 | 5 | 6 | 7 | 8 | 9 | 10 | 11 |
| 2nd | 12 | - | - | 15 | - | - | - | 19 | - | - | 22 |
| 3rd | - | - | - | 26 | - | - | - | 30 | - | - | 33 |
| 4th | - | - | - | 37 | - | - | - | 41 | - | - | 44 |

LEGEND  BLK  BLANK
BL.  BLADE

FIG. 9

INVENTOR.
BY FRED OTIS
LeBlanc + Shur
ATTORNEY

April 18, 1967     F. OTIS     3,314,271
PUNCH PRESS Filed April 3, 1964     6 Sheets-Sheet 5

FIG. 10

INVENTOR.
FRED OTIS
BY LeBlanc & Shur
ATTORNEY

April 18, 1967  F. OTIS  3,314,271
PUNCH PRESS
Filed April 3, 1964   6 Sheets-Sheet 6

FIG. 11

| PART LENGTH IN INCHES | SET ON COUNTERS | NUMBER OF PATTERNS | DIE PROGRESSIONS | STROKES ON COUNTERS | | |
|---|---|---|---|---|---|---|
| | | | | COUNTERS FOR BLADES | | |
| | | | | A (198) | B (210) | C (212) |
| 2 11/32 | 1 | 3 | 1 | OFF | OFF | 0 |
| 3 1/8 | 4 | 4 | 1 1/3 | 0 | 1 | 2 |
| 3 29/32 | 5 | 5 | 1 2/3 | 0 | 3 | 1 |
| 4 11/16 | 2 | 6 | 2 | OFF | OFF | 0 |
| 5 15/32 | 7 | 7 | 2 1/3 | 0 | 2 | 4 |
| 6 1/4 | 8 | 8 | 2 2/3 | 0 | 5 | 2 |
| 7 1/32 | 3 | 9 | 3 | OFF | OFF | 0 |
| 7 13/16 | 10 | 10 | 3 1/3 | 0 | 3 | 6 |
| 8 19/32 | 11 | 11 | 3 2/3 | 0 | 7 | 3 |
| 9 3/8 | 4 | 12 | 4 | OFF | OFF | 0 |
| 10 5/32 | 13 | 13 | 4 1/3 | 0 | 4 | 8 |
| 10 15/16 | 14 | 14 | 4 2/3 | 0 | 9 | 4 |
| 11 23/32 | 5 | 15 | 5 | OFF | OFF | 0 |
| 12 1/2 | 16 | 16 | 5 1/3 | 0 | 5 | 10 |
| 13 9/32 | 17 | 17 | 5 2/3 | 0 | 11 | 5 |
| 14 1/16 | 6 | 18 | 6 | OFF | OFF | 0 |
| 14 27/32 | 19 | 19 | 6 1/3 | 0 | 6 | 12 |
| 15 5/8 | 20 | 20 | 6 2/3 | 0 | 13 | 6 |
| 16 13/32 | 7 | 21 | 7 | OFF | OFF | 0 |
| 17 3/16 | 22 | 22 | 7 1/3 | 0 | 7 | 14 |
| 17 31/32 | 23 | 23 | 7 2/3 | 0 | 15 | 7 |
| 18 3/4 | 8 | 24 | 8 | OFF | OFF | 0 |

FIG. 12

INVENTOR.
BY FRED OTIS
LeBlanc and Shur
ATTORNEYS

United States Patent Office 3,314,271
Patented Apr. 18, 1967

3,314,271
PUNCH PRESS
Fred Otis, Miami, Fla., assignor to Automated Building Components, Inc., Miami, Fla., a corporation of Florida
Filed Apr. 3, 1964, Ser. No. 357,154
17 Claims. (Cl. 72—325)

This invention relates to a punch press and more particularly to a punch press die set having an improved part straightener and cut-off blade construction.

The present invention relates to a punch press for forming connector plates from a continuous strip or sheet of metal. These plates are formed in sections of various length and are provided with integral upstanding nail-like teeth for use in forming stress-bearing wooden joints such as are used is present day building construction. Connectors of the type formed by the press of the present invention are more fully shown and described in assignee's copending application, Ser. No. 250,663, filed Jan. 10, 1963, and now abandoned.

An important feature of this invention involves a multiple blade cut-off assembly which provides for greater flexibility in finished connector plate length while at the same time permitting an increased rate of feed of material through the press.

Conventional punch-press feed arrangements involve the production of a continuous series of repetitive patterns punched in the feed material. At the exit side of the press there is usually provided a single cut-off blade which cuts the feed strip into suitable lengths containing the desired number of patterns. The material is fed intermittently and usually at a predetermined fixed length for individual feed of a particular die or run of material; that is, the material is fed during the time that the die is open and is stopped during the actual punching operation. As a result, the single conventional cut-off blade can only produce lengths of material which are either equal to or an integral multiple of the length of material fed into the press during each stroke or cycle. For example, if the feed length per stroke is set equal to one complete pattern per press cycle, then the single blade cut-off is limietd to the production of plates having an integral number of patterns. This represents a serious disadvantage in that the feed length or one-step increment of feed is necessarily limited to the shortest length (i.e., a single pattern) produced by the punch when the finished part is to be used in various lengths that are a continuous multiple of one pattern.

This disadvantage is overcome in the present invention by providing a multiple blade cut-off assembly. With the punch of the present invention, the length of the output connector is not limited to an integral number of feed lengths and similarly the increment of advance of the feed may be much greater than the smallest length of connector produced. With the increase of feed length per cycle of the press, a substantial increase in the rate of production can be obtained.

A further important feature of the present invention is the provision of a novel adjustable part straightener which may be quickly and easily moved to the proper position to straighten the work material as it emerges from the press. Important features of the straightener include the fact that it does not interfere with the die action or any variance in the die shut height.

It is therefore one object of the present invention to provide a novel punch press.

Another object of the present invention is to provide a novel cut-off assembly for a punch press.

Another object of the present invention is to provide a novel multiple blade cut-off for strip feed material.

Another object of the present invention is to increase the rate of feed of strip material through a press.

Another object of the present invention is to provide a novel part straightener for a press.

Another object of the present invention is to provide a part straightener for punch presses which does not interfere with the die action or variance in die shut height.

These and further objects and advantages of the invention will be more apparent upon reference to the following specification, claims and appended drawings wherein:

Normally, when strip or coil stock is fed into a die automatically or manually, and when such die is mounted in a press for this purpose, usually a punch-type or a multiple plunger type press, the stock is fed only when the die is open or when the press ram or plunger is in that portion of a single cycle where the die or dies are sufficiently open to allow the material to be fed through. Thus, the feeding of all such material into a continuously operated press is intermittent and usually of a predetermined fixed length for each individual feed for a particular die or run of material.

It follows that parts so manufactured are usually of a fixed length determined by the arrangement of one or more fixed cut offs in the die or dies. After the stock is initially fed through the die, the parts are usually cut off in equal number and size each time the die or press closes. Certain pierced, punched and/or formed strip manufacturing has an identical pattern throughout its length, even though its ultimate use may be determined by its length. Therefore, if fixed cut offs are used with a die to manufacture parts of this type in various useful lengths, a separate die and feed length set-up is required for each finished part length desired.

Briefly, the present invention provides an automatic multiple blade cut-off which increases production by increasing die and feed length while at the same time providing the versatility of cutting off part lengths to any multiple of a single pattern length. With the multi-blade automatic cut-off of the present invention, the common denominator of the length of all parts required may be a fraction of one full feed length per press cycle. For example, if two blades are used, the common denominator of all parts can be one-half the feed length. If four blades are used, the common denominator can be one-fourth the feed length. The number of blades used is limited only by the configuration of the finished part and the length of the die itself. The die should be long enough to finish one full feed length of the strip or coil material per hit (per cycle) of the press. A number of repetitive patterns equal to one pattern for each blade used can be punched with each press cycle or stock feed increment.

Also, when a coil stock is being punched from one side when being run through a die, there is a tendency for the coil or stock part to curve. When these parts are required to be straight, a straightening process is necessary. In the past, this has been accomplished by a bar on the outside of the die. The bar was attached to the cut-off back-up block and raised to provide a bending action opposite to that of the punches in the die. This bar requires trial settings to find the proper height and sometimes interefers with the die operation. Another prior arrangement was to place a thick block in the die. This latter arrangement is very sensitive and requires an exact die shut height in order to provide the right straightening bend.

The present invention provides an adjustable straightening block built into the die that is readily moved to provide the proper straightening bend action. It does not interfere with the die action or a variance in die shut height.

Figures 1, 1A, 1B, 1C:
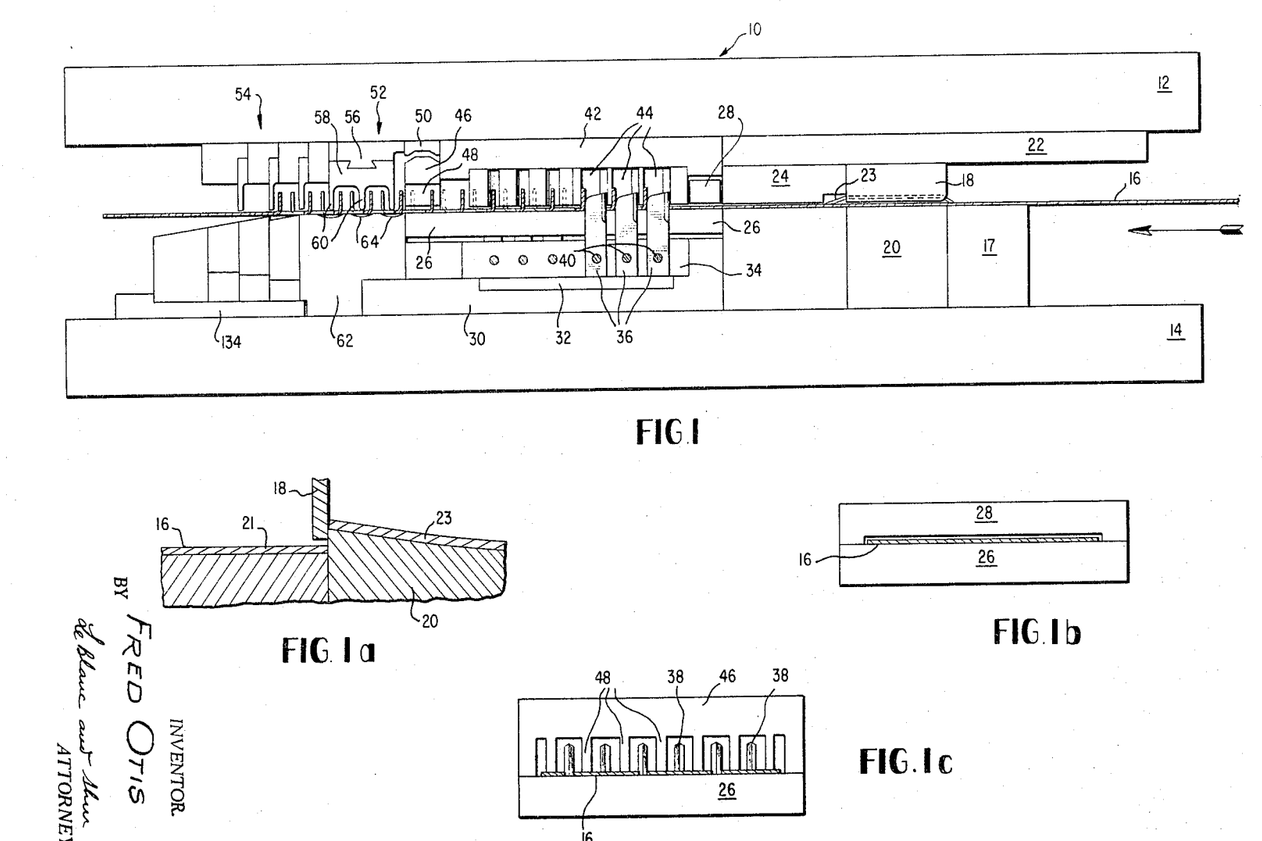
FIGURE 1 is a partly diagrammatic side view of a punch press constructed in accordance with the present invention.
FIGURE 1a is a cross section through the slitter blade of the press of FIGURE 1.
FIGURE 1b is a cross section through the full bridge of FIGURE 1.
FIGURE 1c is a cross section through the comb bridge of the press of FIGURE 1.

Referring to the drawings and particularly to FIGURE 1, the novel press of the present invention includes a die set generally indicated at 10 comprising an upper die shoe 12 and a lower die shoe 14. The die shoes are adapted to be supported from the punch press ram and on a punch press bolster plate in a conventional manner and are customarily provided with suitable guideposts (not shown).

The strip or web of stock 16 is fed into the press from the right hand side in the direction of the arrow by any suitable feed drive. The strip material used in the embodiment illustrated is eighteen gauge galvanized sheet steel for forming wood truss connector plates. Stock 16 first passes over a back-up block 17 and from there between a pair of upper and lower slitter blades 18 and 20 where the stock is slit longitudinally into a pair of parallel travelling webs or sheets. Lower slitter blade 20 is suitably secured to lower die shoe 14 while upper blade 18 is connected to a base 22 secured to the upper die shoe 12. Stock 16 is illustrated as slit into two parallel strips 21 and 23 in FIGURE 1a.

From the slitter blade the stock passes through a spanker 24 where the stock is spanked or flattened to reduce any unevenness that might have been caused by the previous slitting operation.

From the spanker, the stock passes over a stripper 26 and beneath a full bridge 28 shown in cross section in FIGURE 1b. Stripper 26 is spring loaded and has stops limiting its upward motion from the position illustrated in FIGURE 1.

A punch holder base 30 of steel is bolted and doweled to lower die shoe 14 and carries a hardened punch pad 32. Above the punch pad is a punch holder 34 which holds a plurality of hardened punches 36 which pass upwardly through the stock to form a plurality of upstanding nail-like teeth 38. The individual punches 36 are secured in a stacked array by a plurality of transverse rods 40 provided with screws on their ends so that the punches can be securely tightened together while at the same time being individually replaceable. A die base 42 is positioned over the punches and is attached to the upper die shoe 12. The die base supports a plurality of die sections 44 which are individually screwed to the die base. In the embodiment illustrated the punch and dies are formed in groups of three along the direction of travel of the work so that during a single cycle of operation, three complete patterns are produced in the stock.

Carried at the opposite end of the stripper 26 from the full bridge is a comb bridge 46 shown in cross section in FIGURE 1c. The comb bridge is provided with a plurality of downwardly extending teeth 48 which pass between the teeth 38 punched in the stock and this comb bridge, in conjunction with the full bridge, acts to keep the stock on the stripper. The bridges are preferably bolted to the ends of the stripper and the upper die shoe 12 is provided with a spacer plate 50 over the comb bridge 46.

Important features of the present invention include the provision of an adjustable die straightener generally indicated at 52 followed by an automatic multiple cut-off assembly generally indicated at 54. The straightener assembly includes an actuator wedge 56, a straightener 58 having a plurality of transversely extending straightening fingers 60 connected to the upper die shoe 12 and a straightener block 62 connected to the lower die shoe 14. Straightener block 62 is provided with a plurality of transversely extending shallow cavities 64 on the opposite side of the stock from the fingers 60 so that the fingers tend to drive the stock into the cavities to straighten it after the punching operation.

Figure 2:
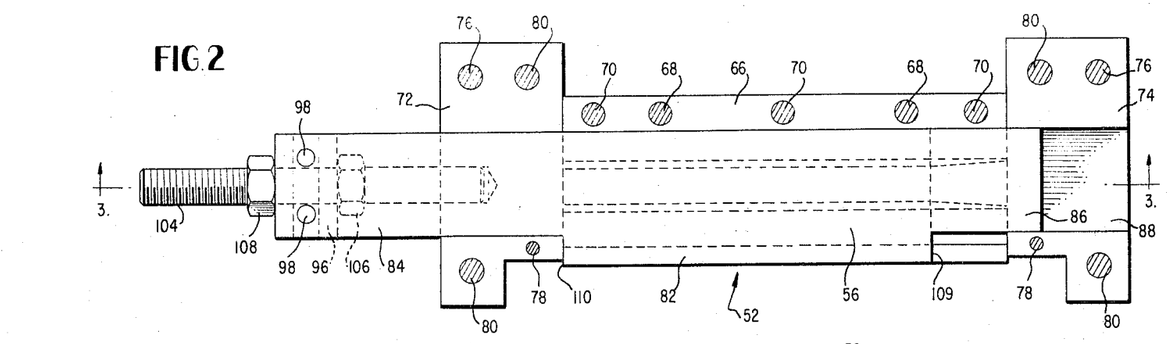
FIGURE 2 is a plan view of the stock straightener of FIGURE 1.
Figure 3:
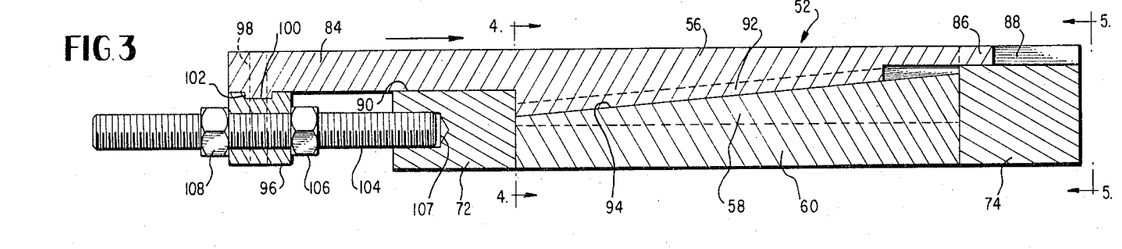
FIGURE 3 is a cross section taken along line 3—3 of FIGURE 2.
Figure 4:
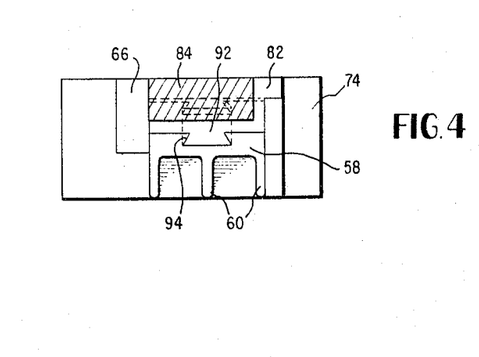
FIGURE 4 is a cross section taken along line 4—4 of FIGURE 3.
Figure 5:
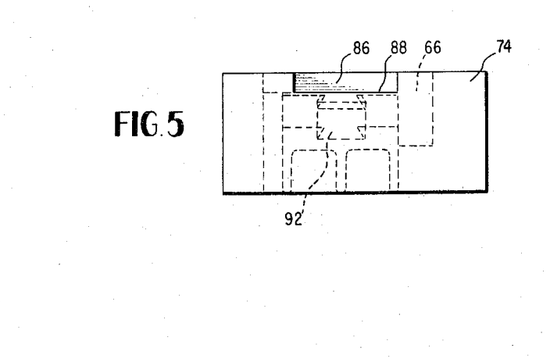
FIGURE 5 is an end view taken along line 5—5 of FIGURE 3.

FIGURES 2 through 5 show the details of the straightener assembly 52. FIGURE 2 is a plan view looking down on the straightener with the top shoe removed and FIGURE 3 is a cross section through the center line of the straightener assembly taken on line 3—3 of FIGURE 2. A spacer block 66 is secured to the top shoe 12 by dowels 68 and countersunk bolts 70. Abutting the opposite ends of the spacer block 66 are a pair of guide blocks 72 and 74 each provided with large positioning dowels 76, small dowels 78, and adapted to be bolted to the upper die shoe by countersunk bolts 80.

Wedge 56 is provided with an enlarged center section 82 and a pair of reduced end portions 84 and 86. Thinner end section 86 is slidably received in a relatively shallow groove 88 formed in guide block 74 while the thicker end portion 84 is similarly slidably received in a deeper groove or slot 90 formed in the other guide block 72. Enlarged center section 82 is provided with a depending dove tail projection 92 which slants upwardly from left to right in FIGURE 3. Dove tail projection 92 is adapted to be slidably received in a mating dove tail slot 94 formed in the upper surface of straightener 58.

Narrowed end 84 of the wedge 56 carries a retainer ring 96 secured thereto by bolts 98. Portion 84 is provided with a projection 100 received in a suitable slot 102 in the retainer ring so that the wedge and retainer ring move in unison. Ring 96 is slidably received over a threaded adjusting screw 104 on which are mounted lock nuts 106 and 108 for accurately positioning the retainer ring 96. The end of screw 104 is received in a cavity 107 formed in guide block 72.

As illustrated in FIGURES 2 through 5, straightener 58 is in its retracted or uppermost position. Upon loosening nut 106 and tightening nut 108 retainer ring 96 is advanced to the right along the length of the screw and acts to drive wedge 56 in the direction of the arrow shown in FIGURE 3. As a result, the wedge acts to cam straightener 58 downwardly between the guide blocks to the desired position. Edges 109 and 110 of enlarged central section 82 of the wedge in butting against the respective guide blocks 72 and 74 act as stops in limiting the extreme positions of the wedge and hence the upward and downward movement of the straightener.

Figures 6, 7, 8:
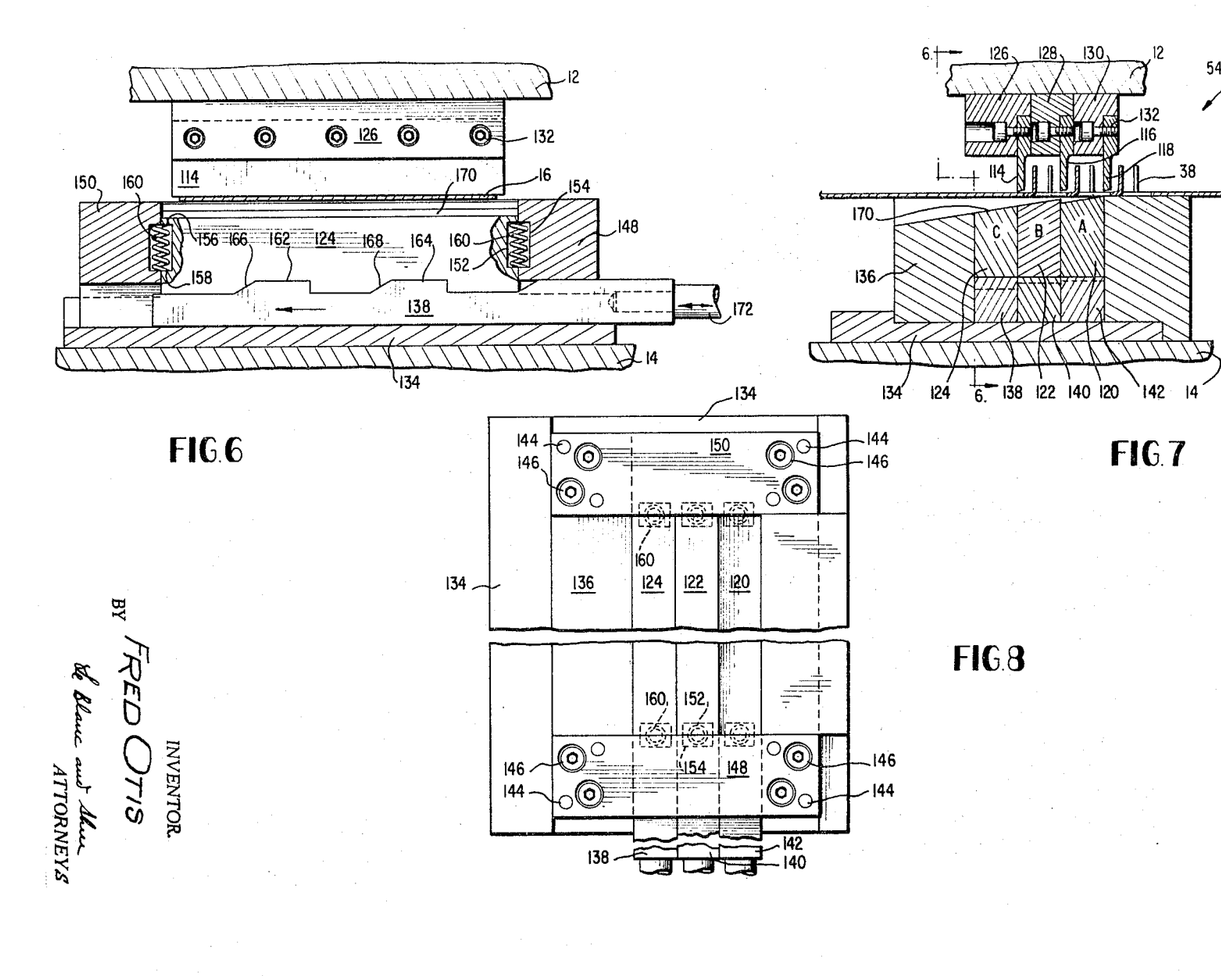
FIGURE 6 is a cross section through the cut-off blade assembly of FIGURE 1.
FIGURE 7 is a cross section at right angles to that of FIGURE 6.
FIGURE 8 is a plan view of the cut-off blade assembly.

FIGURES 6, 7 and 8 show the details of the novel multiple blade cut-off assembly 54. The assembly generally comprises three upper cut-off blades 114, 116 and 118 and three vertically adjustable lower cut-off blades 120, 122 and 124 labelled A, B and C, respectively, in FIGURE 7. Secured to the upper die shoe 12 are three upper cut-off blade holders 126, 128 and 130. These holders are connected to the upper shoe by dowels and countersunk screws. The upper blades 114, 116 and 118 are connected to the blade holders by tapped screws such as that indicated at 132.

A cut-off base 134 is connected to the lower die shoe 14 and carries a back-up block 136 for the lower cut-off blades and lower cut-off blade actuators 138, 140 and 142. Connected by dowels 144 and counterbored screws 146 to the cut-off base 134 are a pair of side blocks 148 and 150.

As best seen in FIGURE 6, each of the blades 120, 122 and 124 is provided with a cavity such as 152 adjoining a mating cavity 154 in the respective side block. The mating cavities combine to form a cylindrical pocket having end surfaces 156 and 158 against which bear the opposite ends of a coil spring 160 which acts to return the blades to the normal rest or lowermost position. Each of the actuators such as 138 is provided with a pair of projections 162 and 164 defining sloping cam surfaces 166 and 168 which act to cam the blades such as blade 124 upwardly into cut-off position.

As best seen in FIGURE 7, each of the blades is tapered as at 170 and their cutting edges do not lie in the same horizontal plane. This is to prevent interference with proper drop-out of the connector plate which has been cut off. As a result, each of the blades has a different length of rise under the influence of its actuator. For example, in one embodiment constructed in accordance with the present invention, blade 120 had a rise of .110 inch, blade 122 a rise of .125 inch and blade 124 a rise of .245 inch. This difference in rise is accomplished by varying the height of the projections such as 162 and 164 of the respective actuators.

Each of the actuators is connected to a longitudinally movable actuator rod 172 which in turn is connected to a suitable drive, for example to an air motor.

Figure 9:
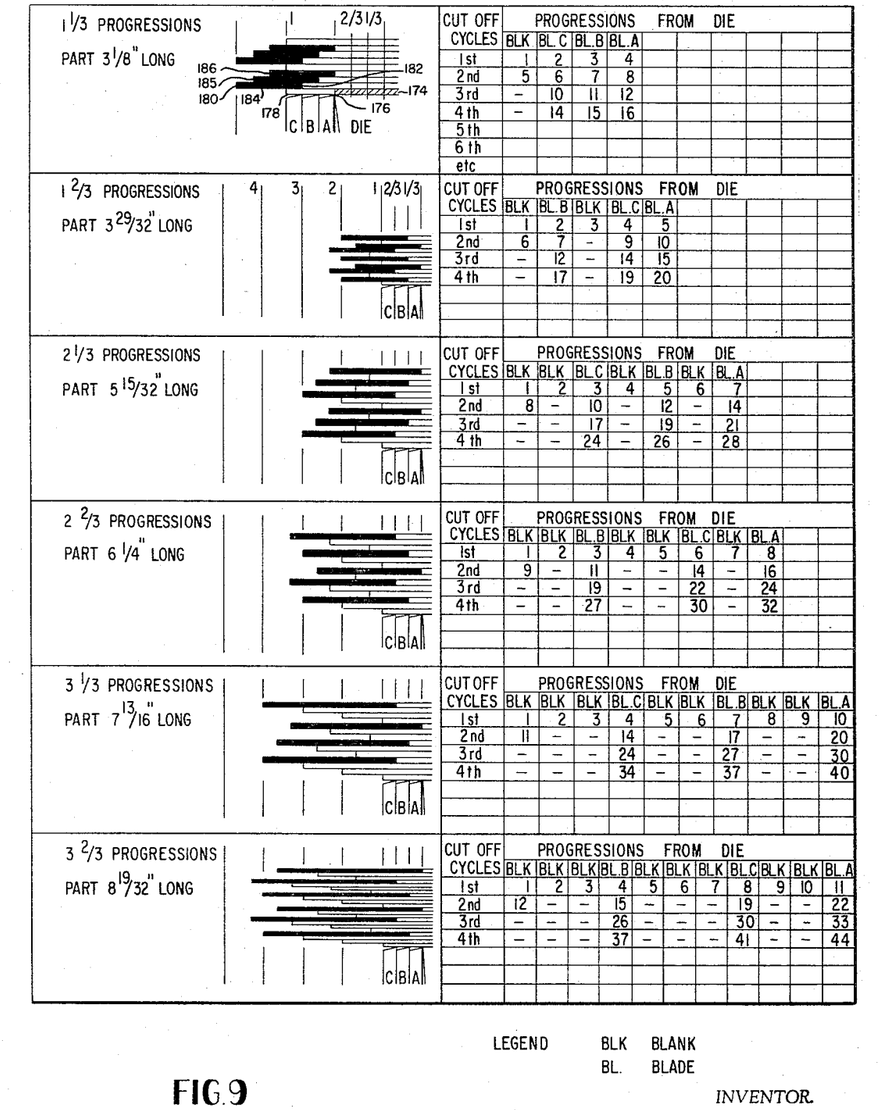
FIGURE 9 is a chart of blade cut-off sequence for the press of FIGURE 1.

FIGURE 9 is a chart showing the cycle of the cut-off blades labelled A, B and C in FIGURE 7 for various desired connector plate lengths. The chart diagrammatically shows the cut-off sequence for 18-gauge plate stock having three complete or repetitive patterns per feed progression. In the chart of FIGURE 9 one progression is equal to one increment or step of feed or three complete patterns. If only a single blade cut-off were used, it would only be possible to obtain connector plate lengths that were integers of one progression; that is, connector plates having 3, 6, 9, etc. complete patterns. In order to obtain integers of only a single pattern with a single cut-off blade it would be necessary to reduce the length of feed or progression to that of a single pattern. In the specific embodiment shown, a single progression is equal to 2 11/32 inches which is the length of three complete patterns.

The upper left hand box in the chart of FIGURE 9 shows the blade cut-off sequence for obtaining connector lengths of 1⅓ progressions or four complete patterns. In this case, the connector lengths are 3⅛ inches. The cross hatched material indicated at 174 illustrates the start position of the stock where it is flush with the cut-off edge 176 of blade A. The first increment of feed brings the stock to the position illustrated at 178 at which time none of the blades is actuated and no cut-off takes place. This is also indicated by the upper right hand box in FIGURE 9 wherein the numeral 1 occurs in the column labelled "BLANK" to illustrate that no blade is actuated after the first progression or feed increment.

The second increment of feed brings the stock to the position illustrated at 180 and at the end of this feed blade C is actuated to cut off the stock at 182. This produces a plate 184 equal in length to 1⅓ progressions or four complete patterns. This cut off is illustrated in the upper right hand block by the numeral 2 appearing in the column labelled "Blade C" indicating that blade C is actuated after the second progression or press cycle.

After the block has been cut off at 182 the third increment of feed brings the end of the stock to the position illustrated at 185 and blade B is then actuated after this third press cycle. Aagin a plate of length equal to plate 184 is produced. At the end of the fourth feed cycle the end of the stock is at the position illustrated at 186 and blade A is actuated to again cut off a plate equal in length to the previous two plates, namely equal to 1⅓ progressions. After the fourth press cycle the fifth cycle produces no actuation of the blades as represented by the numeral 5 appearing in the column labelled "BLANK" in the upper right hand box of FIGURE 9. This represents the initiation of a second cut off cycle as illustrated by the label "2nd" appearing in the column headed "Cut Off Cycles." These cut-off cycles are to be distinguished from the machine or press cycles since for connectors of 1⅓ progressions, four machine cycles are necessary to produce one cut-off cycle. As further illustrated by the machine cycles 5, 6, 7, 8 and 9, the entire sequence of cut-off is then continuously repeated.

The remaining portions of the chart in FIGURE 9 show the cut-off sequence and cycles for 1⅔ progressions, 2⅓ progressions, 2⅔ progressions, 3⅓ progressions and 3⅔ progressions. It is believed that the sequences will be readily understood from the above description of the cut off sequence given. It is further felt that sequences for greater lengths of connector plates is also readily apparent.

When it is desired to produce connector lengths equal to an integral number of progressions, only a single blade is actuated after the appropriate number of feed increments. For example, if connectors of a single progression length are desired, any one of the blades A, B or C could be actuated, but only one of them, after each feed increment. Similarly, if a greater or lesser number of blades is utilized, it is possible to obtain corresponding lengths which may be broken up into fractions of a progression wherein the fraction denominator is equal to the number of cut-off blades. For example, if four cut-off blades are utilized, lengths equal to integrals of one-fourth of a progression may be obtained.

Figure 10:
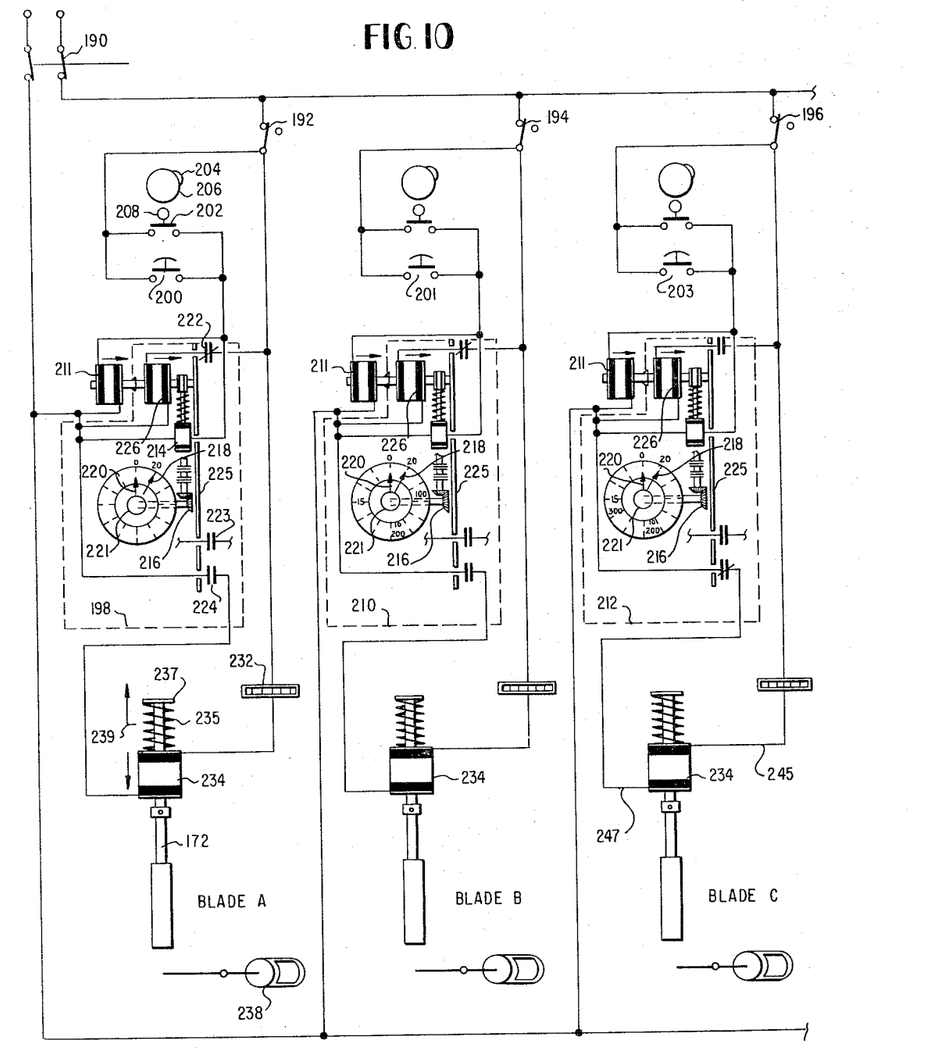
FIGURE 10 is a circuit diagram showing the blade cut-off control and actuation.

FIGURE 10 shows a circuit diagram of a control circuit for the multiple blade cut-off assembly. The manual on-off switch 190 connects the circuit to a suitable source of electrical supply which may be a conventional 110 or 220 volt A.C. line outlet. Further manual on-off switches 192, 194 and 196 are provided to control the individual blades again labelled A, B and C, as in FIGURE 7.

Blades A, B, and C are controlled by commercially available electro-mechanical (micro-screw) counters 198, 210 and 212. Counters of this type are sold by the Eagle Signal Company, Moline, Ill.; and described as "HZ" series microflex reset counters in their bulletin 720 of July 1960. The counters shown in FIGURE 10 are catalog number HZ40A6, and will count accurately up to 400 counts. These counters are modified by the addition of a solenoid 211 placed mechanically in series with the commercial counting unit's "clutch" and "contact" actuating solenoid 226. Counter 198 has three sets of electrical contacts 222 (NO), 233 (NO) and 224 (NC) with electrical power "off." These contacts are actuated in unison in three separate motions. First, when the clutch solenoid 226 is actuated, their insulated frame (not shown) rotates down to a clutch bar 225 and the contacts reverse position (NO to NC and NC to NO). Second, when the impulse (counting) solenoid 214 completes the predetermined strokes (counts), the clutch bar 225 mechanically removes its interference with the contact frame (not shown), the contact frame rotates further downward and the contacts again reverse. Third, when the clutch solenoid is deenergized, the contact framework and attached contacts pivot upward to their original position without again reversing. The clutch bar 225 returns to its original interference position, and the cycle is ready to repeat. Contacts 222 serve solenoid 226. Contacts 224 serve the cut-off blade solenoid 234. Contacts 223 are spares in the arrangement, FIGURE 10, and can serve a variety of loads or variations in the circuitry.

Blade A is controlled by counter 198 as modified with solenoid 211 and connected to the power supply by manual switch 192, and by normally open contacts 224.

Blade A is operated as follows:

Off/on switch 190 is manually closed. Off/on switch 192 is manually closed. Solenoid 234 is now energized and blade A pushed into cutting position (contacts 224 are still closed; contacts 222 are still open). Switch 200 is momentarily manually closed and/or cam actuated switch 202 is momentarily closed by the press crankshaft 206 rotation and attached cam 204 action that moves cam striker 208. The closing of either switch 202 or 200 causes solenoid 211 to cock the mechanical clutch and to move the contact framework into its first moved position. Thusly, reversing the contacts. Contacts 224 are now open. Solenoid 234 is deenergized. Blade A has been retracted from the cutting position by spring 235 which moves the solenoid armature 237 in the direction of arrow 239. The solenoid armature 237 is coupled to blade actuator arm 172. Contacts 222 are now closed, thereby energizing clutch solenoid 226 and holding the contacts in their present position to await further action. The energized clutch coil 226 also engages the mechanical clutch so that impulses from the counting coil 214 will be registered on the microscrew 216. (Impulse counting will not register on the microscrew unless solenoid 211 or 226 is energized.) While contacts 222 are closed and solenoid 226 is energized, solenoid 211 will impulse synchronously with the counting solenoid 214. However, the physical relation permits repeated actuation of solenoid 211 without disturbing solenoid 226 while solenoid 226 is energized. One count is now registered on the micro-screw. As the press drive continues to rotate, press crankshaft 206 will continue to rotate. Cam 204 will strike follower 208 and momentarily close switch 202 each time the crankshaft makes one revolution (each press cycle). Each time switch 202 closes and opens, impulse solenoid 214 will turn the micro-screw one increment. Thus, one increment of advance on the micro-screw always equals one press cycle (one part feed increment). Prior to starting the cycle count on the counter mechanism, the needles 218 and 220 are set by manually turning knob 221. The short needle 220 is scaled for and indicates an equivalent of 20 impulses per one revolution of the entire dial. The long needle ratioally (20–1) follows the small needle. When the short needle is turned 360 degrees the long will indicate the numeral 20 on the counter dial, etc. Counters 198, 210 and 212 are shown with the short needle 220 pointing to zero and the long needle 218 pointing to 20. Therefore, as outlined above, the counters are set to cycle the contacts 222 and 224 once for every twenty press revolutions. And, there is already one count registered on the micro-screw. The press crankshaft 206 continues turning. Switch 202 cycles once for each press revolution. Impulse coil 214 cycles once and registers one increment on the micro-screw each time switch 202 cycles. On the twentieth impulse, switch 202 or (200) cycles, the clutch mechanically actuates to trip the contacts. At this stage of the sequence, contacts 224 close, solenoid 234 reacts to place blade A in cutting position. At approximately the same time, contacts 222 open and release the clutch by deenergizing the clutch solenoid 226. The "clutch release" automatically resets the counting sequence to repeat so that the next impulse of coil 214 will register on the micro-screw the first count of the pre-set sequence of 20. On the next revolution of the press crankshaft, switch 202 is cycled. Solenoid 211 is energized and its armature pushes the clutch coil 226 aramature to cock the clutch and reverse the contacts 222 and 224. Clutch coil 226 is now energized and held by the closed contacts 222. At the same time, contacts 224 opened to deenergize solenoid 234 and spring 235 returns the cut-off blade assembly to a non-cutting position. The counter has now registered the first count and will repeat the above sequence as the press continues to cycle.

The fixed location and the length of the cam 204 on the crankshaft 206 will determine the timing of the entering and retraction of the cut-off blade so that the blade will be in cut-off position only at the bottom of the press cycle stroke. Cam 204 may be affixed to any other rotating or oscillating mechanism provided that such mechanism is synchronized with the press drive or crankshaft 206.

The purpose of adding solenoid 211 to the commercial counter is to boost the clutch action, adapt the electrical circuitry to the action desired, and to return the counting sequence to one on each cycling of the pre-set counting sequence. The counter as purchased requires a minimum of ¼ to ¾ second "off" time to reset the clutch to properly repeat the counting sequence. The use of solenoid 211 with the circuitry shown in FIGURE 10 provides this "off" time between counting impulses and the circuitry never actually returns to zero during the counting process.

Connected in series with the solenoid 234 circuit is a commercial electrical part counter 232. A mechanical part counter 238 may be provided in lieu of the electrical part counter 232 and may be mechanically actuated by movement of the blade.

Figure 11:
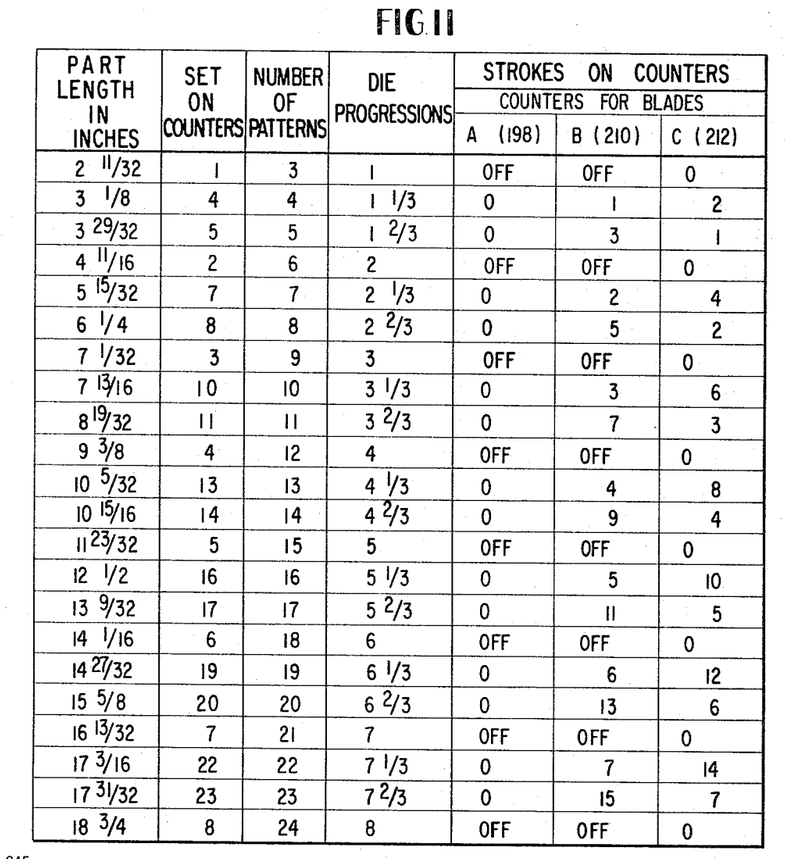
FIGURE 11 is a chart for the blade cut-off control and actuation circuit of FIGURE 10.

FIGURE 11 shows a cut-off sequence chart for the control circuit of FIGURE 10 corresponding to the physical cut-off sequence chart of FIGURE 9. The first column in FIGURE 11 gives the part length in inches. The third column gives the number of patterns in a connector plate. The second column gives the count number manually inserted into the indicators 218 and 220 of the micro-screw counters 198, 210 and 212. The number set by the counter indicators will be described in more detail below and is equal to the number of patterns for fractional progressions. The fourth column in FIGURE 11 gives the connector length in number of progressions and the three rightmost columns give the numbers punched into the counters by the manaul switches 200, 201 and 203 or in the alternative shows when one of the switches 192, 194 or 196 is moved to the off position.

It is believed that the following example will illustrate the meaning of the various sequences given in FIGURE 11 and the operation of the control circuit of FIGURE 10. If connectors of a length seven patterns long are desired, the dial setting action is as follows: On looking at FIGURE 11, the table shows that a seven pattern connector is equal in length to 2⅓ progressions. It is apparent that the connectors are actually divided into a hypothetical seven parts or one part for each pattern. In operation of the machine, manual switch 190 is turned on and the blade control switches 192, 194 and 196 are also turned on. The indicators 218 and 220 of each of the dial counters 198, 210 and 212 is turned to position 7 since this is the number given in FIGURE 11 for a seven pattern length connector. If a connector length of six patterns were desired the indicators 218 and 220 of each of the micro-screw counters would be turned to position 2 as more fully described below.

With the indicators 218 and 220 set at 7 for a seven pattern length, manual switch 203 is pressed four times. By this action, the micro-screw 216 on counter 212 is advanced four steps as indicated by the number 4 in the rightmost column in FIGURE 11 corresponding to seven patterns. Switch 201 is now pressed two times to advance the micro-screw 216 of counter 210 two steps as indicated by the numeral 2 in the second from the right column in FIGURE 11. As indicated in the column for blade A manual switch 200 is not actuated at all so that the micro-screw 216 of counter 198 is advanced no steps. However, as indicated by the zero in this column switch 192 for blade A is left in the on position.

With these settings in the control circuit the physical sequence illustrated in FIGURE 9 for 2⅓ progressions will be followed to produce connector lengths having seven patterns or 5¹⁵⁄₃₂ inches long. As the cams 204 are rotated by the press drive to actuate the switches 202 additional impulses are put into the counters 198, 210 and 212 until such time as their pulse counters 216 reach the clutch release position that was set manually and shown by needles 218 and 220 previously set by turning knob 221. When the position of the micro-screw impulse recorder coincides with preset location for the release of the clutch bar 225, the clutch bar is released, closing contacts 224. When contacts 224 close solenoid 234 actuates and causes the corresponding blade to move upwardly to a position that will cause the stock to be cut off as the press closes. The micro-screw automatically recycles back to its rest position. The clutch will reposition itself for the next release and the count of one will be recorded on the next impulse. Thus, for a seven pattern length, the clutch release will be set for seven impulses as indicated by needles 218 and 220 on the counter dials. The micro-screw will move seven impulse increments. Clutch action closes the circuit through contact 224 to blade A on the seventh impulse. The next impulse withdraws the blade and completes the resetting and starts the count of one for next blade A actuation.

If a six pattern length is desired, indicator 220 of counter 212 is set at position 2. Switches 192 and 194 for counters 198 and 210 are moved to the off position and switch 203 is not manually impulsed since a zero appears in the rightmost column in FIGURE 11 for six patterns. With this setting, blade C is actuated after every two progressions or cycles of the press to produce parts having a six pattern length. In this case, blades A and B are open circuited and are not used. It is believed that the other settings indicated in FIGURE 11 for other part lengths and the corresponding operation of the control circuit of FIGURE 10 is readily apparent.

Figure 12:
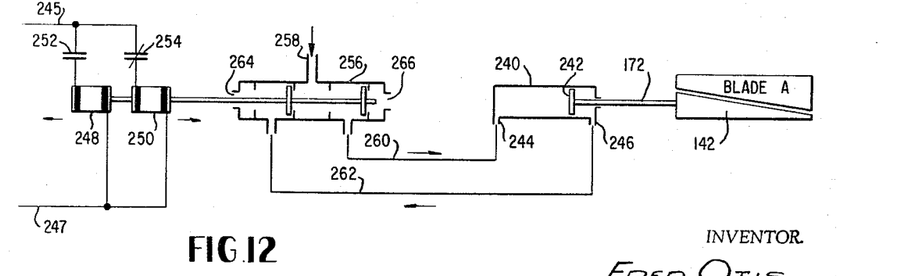
FIGURE 12 is a diagram of a modified blade control and actuation circuit.

FIGURE 12 shows a modified control system for the blades wherein the drive rods 172 are actuated by a double acting air motor 240. The actuator rods are coupled to a piston 242 movable between a pair of air ports 244 and 246. In FIGURE 12 the blade is shown in its up or cut-off position rather than its down or rest position. Connected to the electrical power supply lines 245 and 247 are double solenoids 248 and 250 through normally closed contacts 252 and normally open contacts 254. These contacts are illustrated in the drawing as in the opposite from their normal positions since the blade is illustrated in its actuated or up position. Solenoids 248 and 250 control a four way valve 256 to move the valve in the direction of the respective arrows in FIGURE 12. With the valve 256 in its rightmost position, air in input line 258 from a suitable supply (not shown) is coupled through the valve by way of line 260 to air motor 240 to drive the blade upwardly by way of its actuator 142. The air is exhausted from the opposite side of piston 242 by way of line 262 and exhaust port 264. Conversely, when solenoid 248 is actuated by closure of contacts 252, four-way valve 256 moves to its leftward most position so that the function of supply and exhaust lines 260 and 262 is reversed to drive piston 242 to the left and return the blade to its normal downward position. At this time, air is exhausted from the second exhaust port 266. The modification illustrated in FIGURE 12 provides a positive return for the blades and can substitute for single solenoid 234 spring return system shown on FIGURE 10 when increased blade actuation power is required.

It is apparent from the above that the present invention provides a novel multiple cut-off assembly for strip material having increased flexibility for providing various part lengths and further substantially increasing the rate of material feed. This may be illustrated by comparing a single blade cut-off with the three blade cut-off of the present invention used to manufacture the same parts. Where part lengths of 3⅛ inches, 5¹⁵⁄₃₂ inches, etc. are required the progression of material through a die having a single cut-off would normally be ²⁵⁄₃₂ inch long. This greatly reduces the production rate. However, with the present invention utilizing a three-blade cut-off the feed progression may be 2¹¹⁄₃₂ inches per press revolution. This is a 200% increase or a tripling in production.

Also provided is a novel wedge type adjustable straightener for straightening the stock subsequent to the punching of patterns. The adjustable straightener is built into the die to provide the proper bend action and does not interfere with either operation of the die or variation in die shut height.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A punch press comprising upper and lower relatively movable die shoes, a punch and die set secured to said shoes for operating on stock material passing through said press between said shoes, a straightener block having a plurality of shallow cavities secured to one of said die shoes, a vertically movable straightener secured to the other shoe and having a plurality of straightening fingers in vertical alignment with said cavities, and wedge means for vertically adjusting the position of said straightener with respect to said other die shoe.

2. A press according to claim 1 wherein said wedge means and said straightener are slidably joined by a mating dovetail projection and slot.

3. A punch press comprising upper and lower relatively movable die shoes, a punch and die set secured to said shoes for operating on strip material passing through said press between said shoes, slitter means carried by said shoes, spanker means supported between said slitter means and said punch and die set, a straightener block secured to one of said die shoes on the side of said punch and die set opposite from said spanker means, said straightener block having a plurality of elongated shallow cavities extending transverse to the movement of strip material through said press, a pair of guide blocks secured to the other of said die shoes, each guide block having a groove slidably receiving the ends of a wedge, threaded means for reciprocating said wedge in said guide block grooves, a slanting dovetail projection on a portion of said wedge intermediate said guide blocks, and a straightener having a mating dovetail slot slidably receiving said wedge projection, said straightener having a plurality of spaced elongated fingers extending transverse to the movement of strip material through said press and in vertical alignment with said straightener block cavities, whereby movement of said threaded means acts to adjust the distance between the ends of said fingers and said cavities for a given position of said shoes.

4. A press comprising a pair of relatively movable die shoes, means carried by said die shoes for operating on strip material passing through said press, and a plurality of cut-off blades spaced along the path of movement of said strip material for cutting off different lengths of said material.

5. A press according to claim 4 wherein said blades are operated in synchronism with the cycles of said press.

6. A press comprising a pair of relatively movable die shoes, means carried by said die shoes for operating on strip material passing through said press, and a plurality of cut-off blades spaced along the path of movement of said strip material for cutting off different lengths of said material, the spacing between each blade being equal to a fraction of the length of feed through said press.

7. A press according to claim 6 wherein the numerator of said fraction is one, and the denominator of said fraction is equal to the number of cut-off blades.

8. A punch press comprising a pair of relatively movable die shoes, a punch and die set carried by said die shoes for cyclically operating on strip material fed in increments through said press, a plurality of cut-off blades carried by said die shoes adjacent the outlet of said press, said blades being spaced along the path of movement of said strip material a distance equal to a fraction of the incremental feed length of strip material through said press, and means responsive to relative movement of said shoes for selectively operating said cut-off blades.

9. A punch press comprising a pair of relatively movable die shoes, a punch and die set carried by said die shoes for cyclically operating on strip material fed in increments through said press, a plurality of cut-off blade sets each having cooperating blades secured to said respective die shoes, said sets being spaced along the path of movement of said strip material a distance equal to a fraction of the incremental feed length of strip material through said press, means for moving a blade in each set between an inoperative and a cut-off position, and means responsive to cyclic relative movement of said shoes for selectively moving said blades into cut-off position.

10. A press according to claim 9 wherein said selective moving means comprises a plurality of electrical counters coupled to the drive of said press.

11. A punch press comprising upper and lower relatively movable die shoes, drive means including a drive shaft for cyclically opening and closing said press, a punch and die set carried by said die shoes for punching strip material fed in incremental lengths through said press, each increment of feed corresponding to one punching cycle of said press, a plurality of cut-off blade sets each including an upper and a lower blade secured to a respective die shoe, said blade sets being positioned adjacent the outlet of said press and equally spaced along the path of movement of strip material through said press a distance equal to one over the number of blade sets times the incremental feed length of said strip material, electrical counter means coupled to said drive shaft, and means responsive to said electrical counter means for selectively moving a blade in each set from an inoperative position to a cut-off position.

12. A press according to claim 11 wherein said blade sets are three in number and are spaced a distance equal to one third the incremental feed length.

13. A press according to claim 11 wherein said blades are moved by air motor means.

14. A punch press for punching connector plates from strip metal stock comprising relatively movable upper and lower die shoes, a punch and die set carried by said shoes, stock slitter, spanker and straightener means carried by said die shoes, drive means including a drive shaft for cyclically opening and closing said press to punch nail-like teeth in said stock, a plurality of cut-off blades mounted for vertical reciprocating movement and carried by said die shoes, said blades being equally spaced along the path of movement of stock passing through said press and emerging from said straightener means, said blades each being movable from a retracted inoperative position to an extended cut-off position, an electrical control circuit for moving said blades including an electrical counter, switch means responsive to rotation of said drive shaft for energizing said control circuit to move said blades to cut-off position after a predetermined number of counts, and cam means actuated by said control circuit to move said blades.

15. A press according to claim 14 wherein said stock passes in equal feed increments through said press, one increment of feed for each punch cycle, and said blades are spaced a distance equal to one over the number of blades times the length of a feed increment.

16. A press according to claim 15 wherein said blades are three in number and said wedge means is driven by a solenoid operated air motor.

17. A press comprising a pair of relatively movable die shoes, means carried by said shoes for operating on strip material passing through said press, and a plurality of slitter blade sets spaced along the path of movement of said strip material for cutting different widths of said material, said slitter blade sets being appropriately attached to said die shoes whereby the blade sets are fixed, or whereby one or all of the blade sets may be rendered operative or non-operative by cam actuators.

References Cited by the Examiner
UNITED STATES PATENTS

| | | | |
|---|---|---|---|
| 1,931,420 | 10/1933 | Wakefield | 72—331 |
| 2,397,582 | 4/1946 | Watt et al. | 72—405 |
| 2,834,392 | 5/1956 | Norton | 72—332 |
| 3,094,158 | 6/1963 | Reid | 72—325 |

CHARLES W. LANHAM, *Primary Examiner.*

E. M. COMBS, *Assistant Examiner.*